(12) United States Patent
Someno et al.

(10) Patent No.: US 6,965,477 B2
(45) Date of Patent: Nov. 15, 2005

(54) OPTICAL SHUTTER

(75) Inventors: Yoshihiro Someno, Miyagi-ken (JP); Seiichi Ohgoshi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/842,940

(22) Filed: May 10, 2004

(65) Prior Publication Data

US 2004/0240065 A1 Dec. 2, 2004

(30) Foreign Application Priority Data

May 28, 2003 (JP) .............................. 2003-150542

(51) Int. Cl.$^7$ ............................................. G02B 27/00
(52) U.S. Cl. ....................... 359/579; 359/587; 359/589
(58) Field of Search ............................... 359/579, 587, 359/588, 589, 590; 356/454

(56) References Cited

U.S. PATENT DOCUMENTS

| 5,142,414 A | 8/1992 | Koehler |
| 5,430,574 A | 7/1995 | Tehrani |
| 5,821,989 A | 10/1998 | Lazzaro et al. |
| 5,885,468 A | 3/1999 | Kozlowski |
| 6,833,957 B2 * | 12/2004 | Sato ............................ 359/579 |
| 2002/0154387 A1 | 10/2002 | Mori et al. |
| 2002/0196524 A1 | 12/2002 | Huibers et al |
| 2003/0081319 A1 | 5/2003 | Hsu |

FOREIGN PATENT DOCUMENTS

| JP | 3-169637 | 7/1991 |
| JP | 09/218360 | 8/1997 |

* cited by examiner

*Primary Examiner*—Fayez G. Assaf
(74) *Attorney, Agent, or Firm*—Beyer, Weaver & Thomas LLP

(57) ABSTRACT

An optical shutter including a multi-layer fixed filter and a multi-layer movable filter arranged with a gap therebetween controls the transmittance of light passing through the multi-layer filters. The optical shutter includes minute driving elements provided on the movable filter. Operating the minute driving elements varies a distance of the gap defined between the fixed filter and the movable filter. Operation of the movable filter is restricted by a stopper that comes into contact with the movable filter when the gap has the maximum distance and by a bump formed on the fixed filter. The minute driving elements are joined to the movable filter with elastic bonding layers therebetween.

4 Claims, 7 Drawing Sheets

OPTICAL SHUTTER

BACKGROUND OF THE INVENTION

1. Field of the Invention

The present invention relates to optical shutters for controlling the transmittance of light used in holographic memory units or optical communications devices and, in particular, to an optical shutter capable of varying the transmittance of light by means of a slight operation.

2. Description of the Related Art

Presently, mechanical optical shutters that control transmission/blocking of light are known and widely used in optical devices such as optical memory units, optical logic units, and optical communications devices. Such a conventional mechanical optical shutter is disclosed in, for example, Japanese Unexamined Patent Application Publication No. 9-218360. The mechanical optical shutter controls transmission/blocking of light by operating light-shielding plates disposed in an optical path to open or close the optical path. Aside from such an optical shutter that opens or closes the optical path by parallel movement of the light-shielding plates, there are other mechanical optical shutters that open or close optical paths by rotating light-shielding plates. In either case, light-shielding plates are operated in order to open or close the optical path.

In memory units using holographic principles (hereinafter referred to as "holographic memory units"), pulsed light is used as a reference beam and a beam to illuminate an object and the pulsed light is formed by using optical shutters. In this case, higher response speed is preferable.

Conventional mechanical optical shutters, however, require a minimum movement on the order of 10 $\mu$m for the light-shielding plates in order to open or close the optical paths. Each of the light-shielding plates, even a minute one, has a certain weight, and therefore, the response speed is limited to about 200 $\mu$s. Since holographic memory units need a response speed of 50 $\mu$s or less, it is necessary to significantly enhance the response speed over that achievable by conventional techniques. Optical shutters achieving high response speed are desired in, for example, the field of optical communications, as well as in holographic memory units.

In conventional mechanical optical shutters, the mechanisms required for driving the light-shielding plates are inevitably large due to the large distances that the light-shielding plates must travel. For light-shielding plates driven by piezoelectric elements, increased thicknesses of these piezoelectric elements are necessary to move the light-shielding plates by a large distance because the light-shielding plates expand or shrink in a predetermined ratio in accordance with their thicknesses. Consequently, the overall units are unavoidably large.

SUMMARY OF THE INVENTION

An object of the present invention is to provide an optical shutter that is smaller and operable at high speed in order to overcome the foregoing problems.

In accordance with the present invention, an optical shutter includes a multi-layer fixed filter and a multi-layer movable filter arranged with a gap therebetween, and minute driving elements provided on the movable filter. The optical shutter controls the transmittance of light passing through the multi-layer filters, and operating the minute driving elements varies a distance of the gap defined between the fixed filter and the movable filter.

According to the optical shutter of the present invention, the multi-layer filters are arranged with the gap therebetween, and operating the minute driving elements varies the distance of the gap defined between the fixed filter and the movable filter. As a result, the characteristics of a filter composed of the fixed filter, the movable filter, and the gap are varied by a slight operation, thus switching between transmission/blocking of light in a predetermined wavelength region at high speed. The slight operation achieves reduced thicknesses of the minute driving elements, thus achieving miniaturization of the optical shutter.

In the optical shutter of the present invention, operation of the movable filter may be restricted by a stopper that comes into contact with the movable filter when the gap has a maximum distance and by a bump, that comes into contact with the movable filter when the gap has a minimum distance, formed on the fixed filter.

According to the optical shutter of the present invention, operation of the movable filter may be restricted by the stopper that comes into contact with the movable filter when the gap has the maximum distance and by the bump formed on the fixed filter. As a result, the optical shutter is readily operated so as to transmit or block light in a predetermined wavelength region.

In the optical shutter of the present invention, the minute driving elements may be joined to the movable filter with elastic bonding layers therebetween.

According to the optical shutter of the present invention, the minute driving elements may be joined to the movable filter with the elastic bonding layers therebetween. As a result, errors in the distance traveled by the minute driving elements are accommodated, and thus the movable filter is operated accurately.

In the optical shutter of the present invention, the fixed filter, the gap, and the movable filter may function as a band-pass filter.

According to the optical shutter of the present invention, the fixed filter, the gap, and the movable filter may function as a band-pass filter. As a result, a slight change in the distance of the gap allows transmittance of light in the entire filter to vary greatly, and therefore, switching between transmission/blocking of light in a predetermined wavelength region is achieved by a slight operation.

In the optical shutter of the present invention, the fixed filter, the gap, and the movable filter may function as a minus filter and a predetermined wavelength region in which transmittance is controlled may lie in a harmonic range in the transmittance characteristics of the minus filter.

According to the optical shutter of the present invention, the fixed filter, the gap, and the movable filter function as a minus filter and the predetermined wavelength region in which transmittance is controlled lies in the harmonic range in the transmittance characteristics of the minus filter. As a result, the degree of variation in the transmittance in the entire filter in accordance with the change in distance of the gap is smaller than that in a band-pass filter, and therefore, the transmittance of light in a predetermined wavelength region is varied by controlling the distance of the gap.

BRIEF DESCRIPTION OF THE DRAWINGS

FIG. 1 is a cross-sectional view of an optical shutter according to a first embodiment when the optical shutter remains switched on;

FIG. 3 illustrates the refractive index distribution in the thickness direction according to the first embodiment when the optical shutter remains switched on;

FIG. 5 illustrates the transmittance characteristics of the optical shutter of the first embodiment when the optical shutter remains switched on;

DESCRIPTION OF THE PREFERRED EMBODIMENTS

Figure 1:
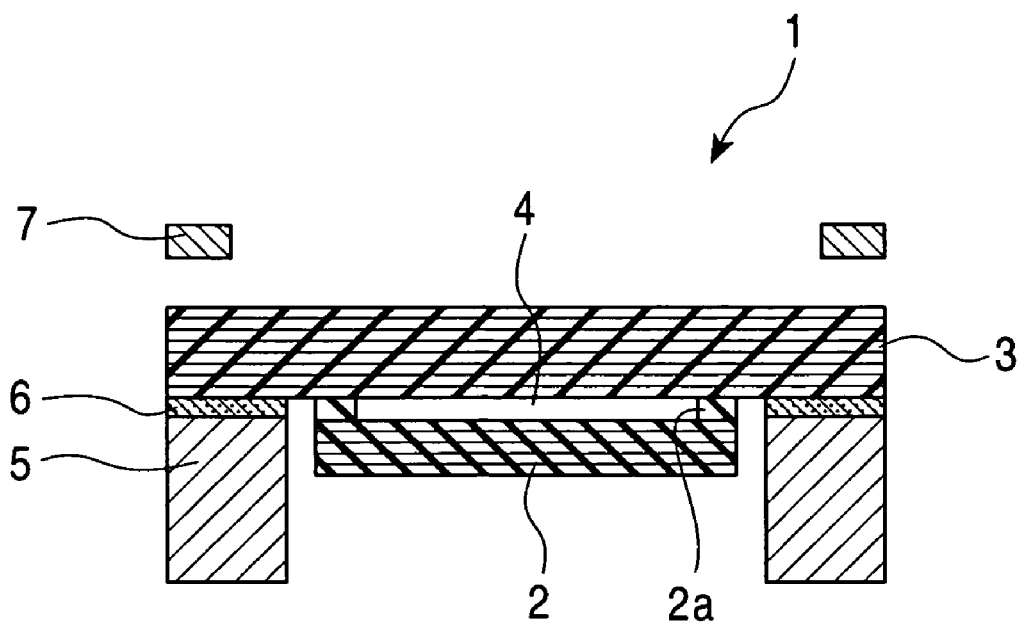
Figure 2:
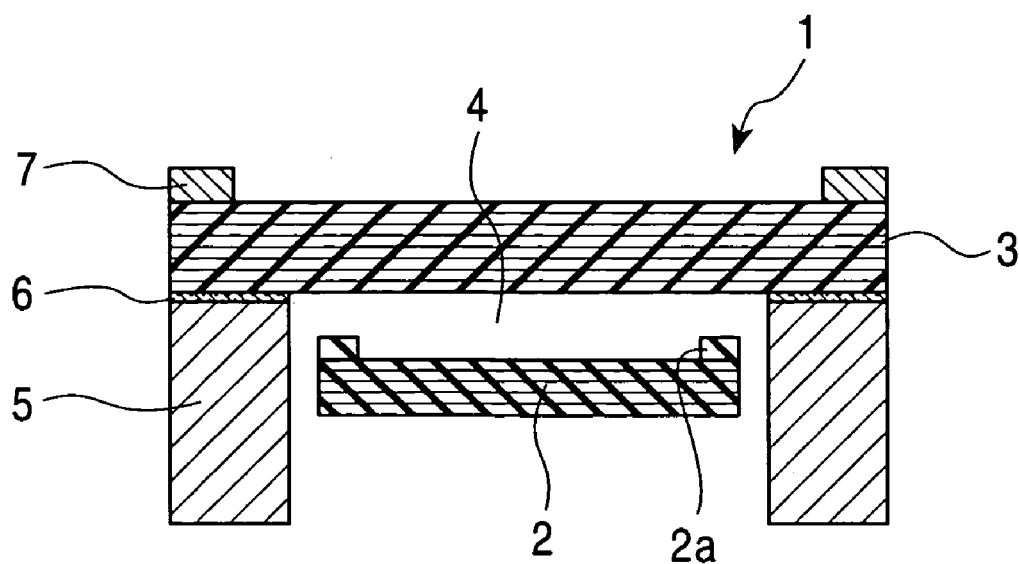
FIG. 2 is a cross-sectional view of the optical shutter according to the first embodiment when the optical shutter remains switched off.

The preferred embodiments of the present invention will now be described in detail with reference to the drawings. FIG. 1 is a cross-sectional view of an optical shutter 1 of a first embodiment in an on state, and FIG. 2 is a cross-sectional view of the optical shutter 1 in an off state. As shown in these drawings, the optical shutter 1 includes a multi-layer fixed filter 2 and a multi-layer movable filter 3 arranged with a gap 4 therebetween. The movable filter 3 is joined to minute driving elements 5 that are driven by the application of an electric field with elastic bonding layers 6 therebetween and is thus vertically movable in the drawings.

The minute driving elements 5 are composed of piezoelectric elements, and varying the electric field applied to these elements allows the minute driving elements 5 to expand or shrink. Operating the minute driving elements. 5 enables the movable filter 3 to vertically move in the drawings. This varies the distance of the gap 4 defined between the fixed filter 2 and the movable filter 3. According to the optical shutter of the present invention, varying the distance of the gap 4 changes the transmittance characteristics of the entire filter defined by the fixed filter 2, the movable filter 3, and the gap 4, thereby controlling transmission/blocking of light in a predetermined wavelength region. Since the movable filter 3 and the minute driving elements 5 are joined with the elastic bonding layers 6 therebetween, errors in operation of the minute driving elements 5 are accommodated by the elastic bonding layers 6.

The fixed filter 2 has a bump 2a on the periphery of the surface facing the movable filter 3. The bump 2a must be formed accurately so as to have a predetermined height. In order to form the bump 2a, the center, which transmits light, of the fixed filter 2 is masked in the last deposition step of the process of depositing the multi-layer filters and then only the periphery of the surface of the fixed filter 2 is coated to the predetermined height. Thus, the bump 2a is formed accurately.

As shown in FIG. 1, the movable filter 3 comes nearest to the fixed filter 2, i.e., comes into contact with a top face of the bump 2a, when the minute driving elements 5 shrink most. Therefore, the height of the bump 2a determines when the gap 4 has a minimum distance. In this state, the distance of the gap 4 defined between the fixed filter 2 and the movable filter 3 is set so that the entire filter functions as a band-pass filter that transmits light in a predetermined wavelength region. When the minute driving elements 5 shrink most, the optical shutter 1 remains switched on for the light in the predetermined wavelength region. In this embodiment, the distance of the gap 4 when switched on is set to be 200 nm, and therefore, the bump 2a is formed so that the height thereof is 200 nm.

By contrast, as shown in FIG. 2, the movable filter 3 is away from the fixed filter 2 most, i.e., comes into contact with a stopper 7 provided in the optical shutter 1, when the minute driving elements 5 expand most. Therefore, the position of a bottom face of the stopper 7 determines when the gap 4 has a maximum distance. In this state, the distance of the gap 4 defined between the fixed filter 2 and the movable filter 3 is set so that the entire filter reflects light in the predetermined wavelength region. When the minute driving elements 5 expand most, the optical shutter 1 remains switched off for the light in the predetermined wavelength region.

In this embodiment, the distance of the gap 4 when switched off is set to be 700 nm, and thus the distance traveled by the movable filter 3 is 500 nm between the switched on and switched off states. Therefore, compared to conventional optical shutters, the switching operation is achieved by moving the movable filter 3 by a smaller distance. Since the piezoelectric elements comprising the minute driving elements 5 expand 0.1% at most during the application of an electric field, it is necessary to set the thickness of the minute driving elements 5 to 500 $\mu$m in order to achieve a traveling distance of 500 nm for the movable filter 3.

Figure 3:
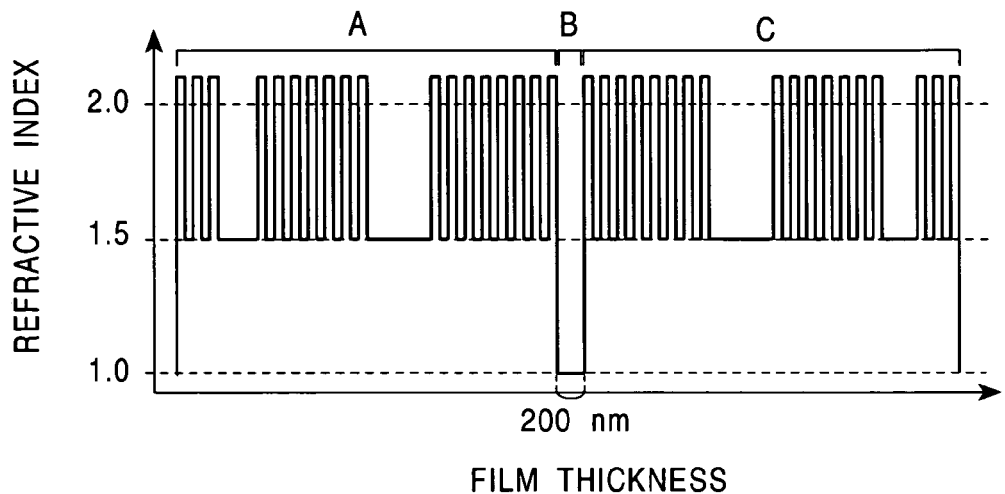

FIG. 3 illustrates the refractive index distribution in the thickness direction of the multi-layer filters when the optical shutter 1 is in the on state. In this embodiment, the entire filter serves as a switch for light in a wavelength region around 400 nm. In this drawing, the horizontal axis and the vertical axis indicate the direction of film thickness and the refractive index, respectively. The area A indicates the fixed filter 2, which is formed from high-refraction layers, each having high refractive index, and low-refraction layers, each having low refractive index, in an alternating manner. The high-refraction layers are made of $TiO_2$ and the like, and the low-refraction layers are made of $SiO_2$ and the like. The area B indicates the gap 4 defined between the fixed filter 2 and the movable filter 3. The area B is 200 nm in thickness and has a refractive index of 1.0. The area C indicates the movable filter 3 and has the same structure as the fixed filter 2.

Figure 5:
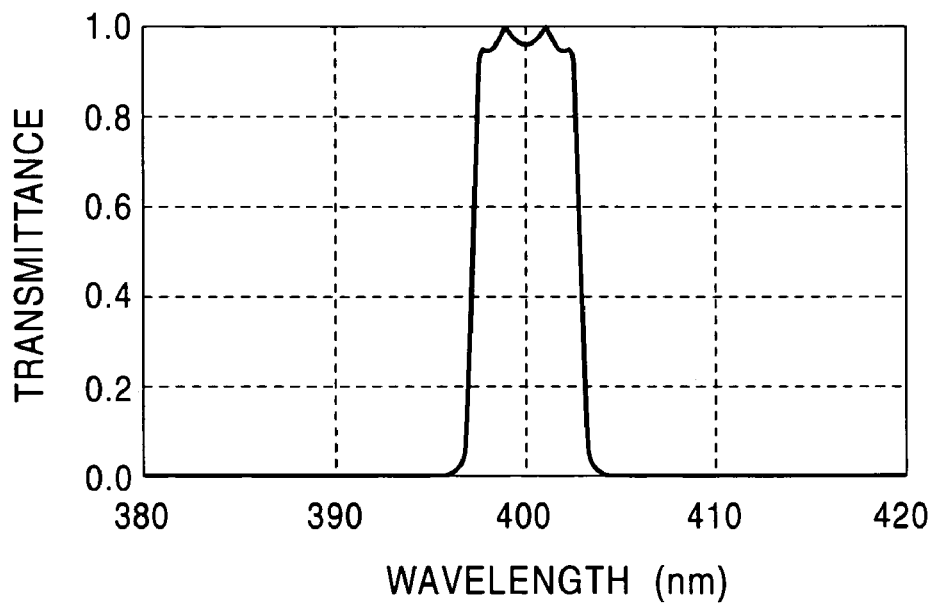

FIG. 5 illustrates the light transmittance characteristics when the areas A to C shown in FIG. 3 are regarded as a single filter. As shown in FIG. 5, when the gap 4 has a minimum distance, light in a wavelength region around 400 nm can be substantially transmitted. As a result, when the minute driving elements 5 shrink most, the entire filter remains switched on for transmitting light in a predetermined wavelength region.

Figure 4:
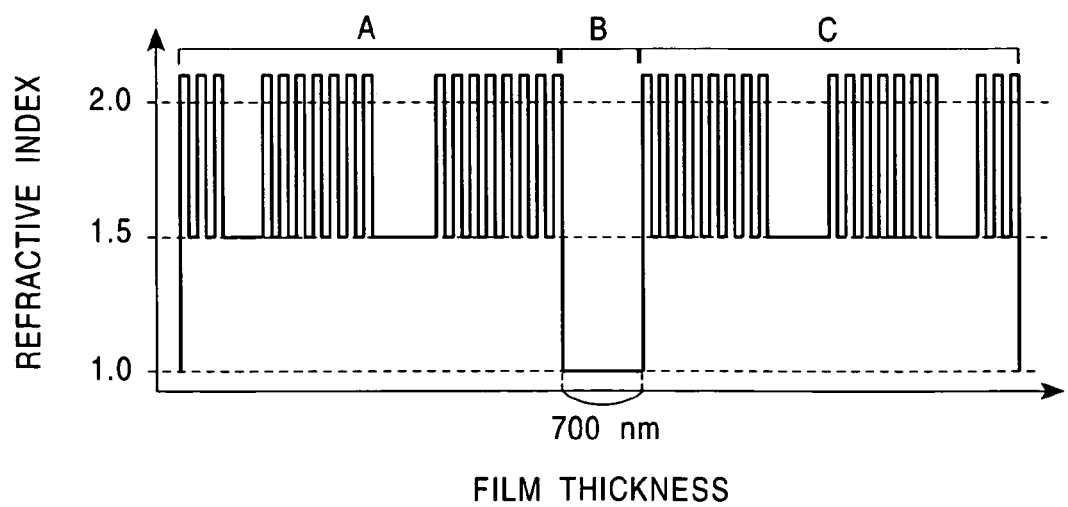
FIG. 4 illustrates the refractive index distribution in the thickness direction according to the first embodiment when the optical shutter remains switched off.
Figure 6:
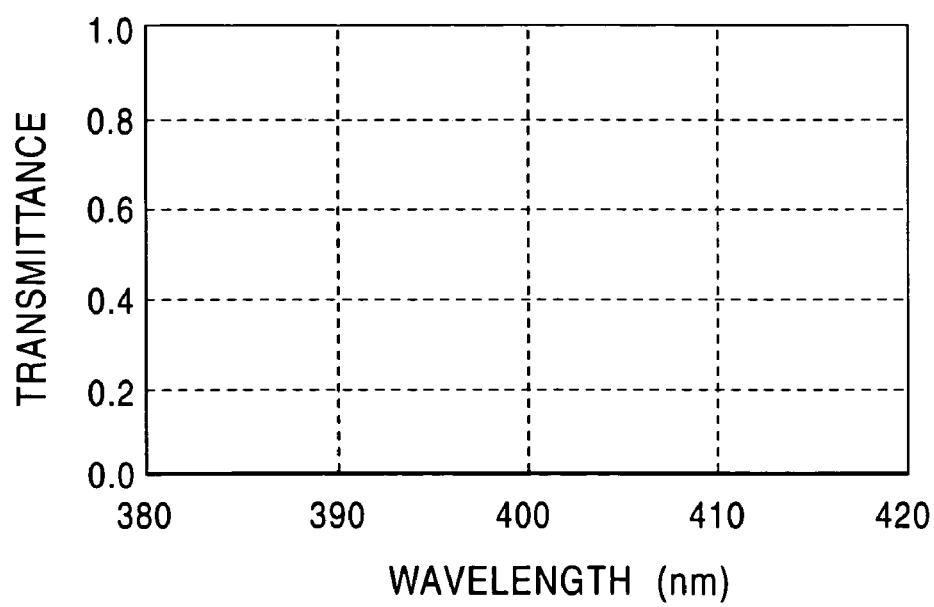
FIG. 6 illustrates the transmittance characteristics of the optical shutter of the first embodiment when the optical shutter remains switched off.

FIG. 4 illustrates the refractive index distribution in the thickness direction of the multi-layer filters when the optical shutter 1 is in the off state. FIG. 4 differs from FIG. 3 in that the thickness of the area B corresponding to the gap 4 is 700 nm. The movable filter 3 is thus shifted in the direction of film thickness. FIG. 6 illustrates the light transmittance characteristics when the areas A to C shown in FIG. 4 are regarded as a single filter. As shown in FIG. 6, when the gap 4 has a maximum distance, the entire filter has zero transmittance for light in a wavelength region around 400 nm, i.e., reflects the light completely. As a result, when the minute driving elements 5 expand most, the entire filter remains switched off for reflecting light in a predetermined wavelength region.

Therefore, operating the movable filter 3 allows the distance of the gap 4 defined between the movable filter 3 and the fixed filter 2 to vary, thereby switching between transmission/blocking of light in a predetermined wavelength region. This achieves switching by a slight operation. Since the stroke in this operation is shorter than conventional optical shutters that block the optical paths with light-shielding plates, the response speed of switching is faster. Accordingly, a high-speed optical shutter is achieved. Additionally, the switching requires merely a slight operation, thus reducing the physical size of the optical shutter.

Figure 7:
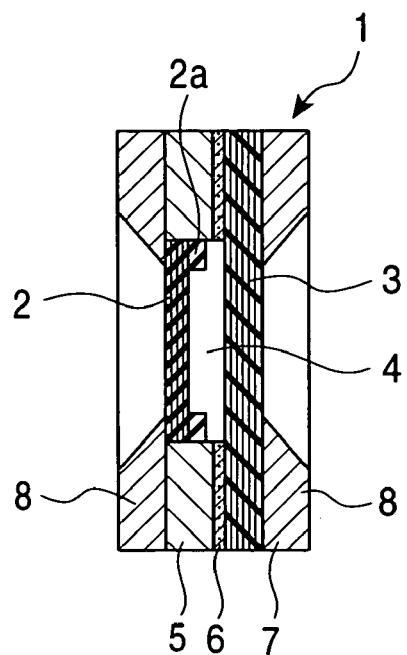
FIG. 7 is a cross-sectional view of an optical shutter according to a second embodiment.
Figure 8:
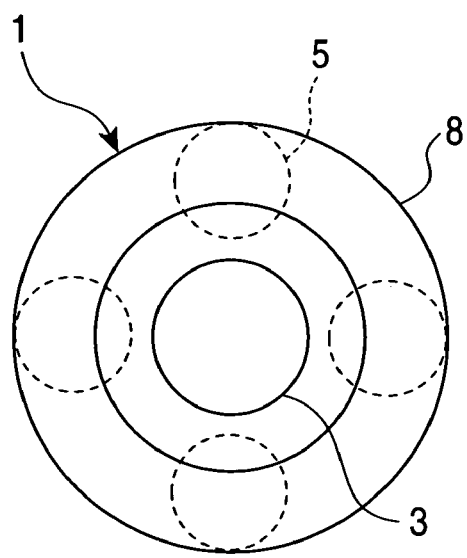
FIG. 8 is a plan view of the optical shutter of the second embodiment.

A second embodiment of the present invention will now be described. FIG. 7 is a cross-sectional view of an optical shutter 1 according to the second embodiment, and FIG. 8 is a plan view of the optical shutter 1 of this embodiment. In the optical shutter 1 of this embodiment, a fixed filter 2 and a movable filter 3 are sandwiched between substrates 8 having central pinholes. As shown in FIG. 8, minute driving elements 5 are arranged at four places around the periphery of the optical shutter 1. One of the substrates 8, which is adjacent to the movable filter 3, functions as a stopper 7 when the movable filter 3 operates.

Figure 9:
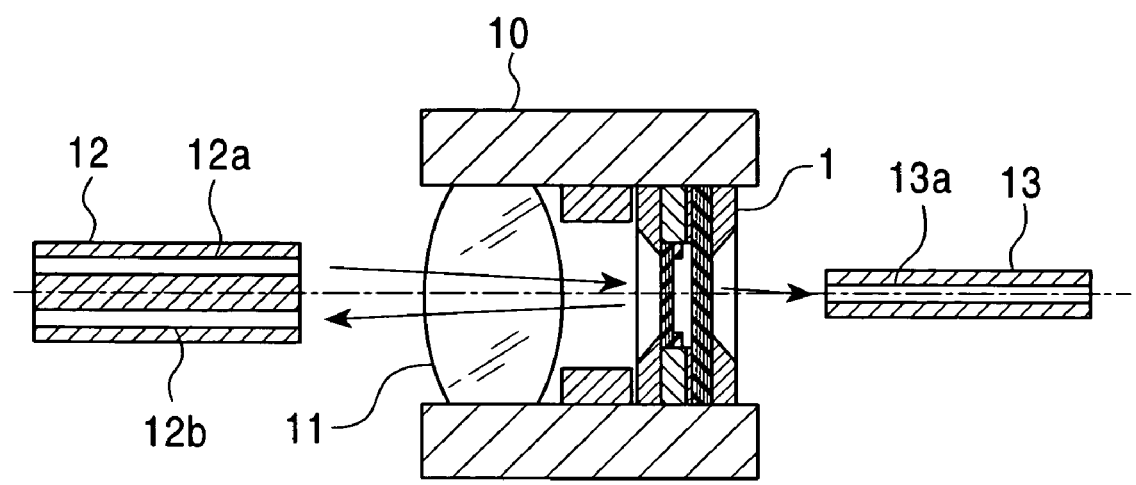
FIG. 9 is a schematic illustration of an optical communications device including the optical shutter of the second embodiment.

FIG. 9 illustrates an optical communications device including the optical shutter 1 of the second embodiment. As shown in this drawing, this optical communications device has a switch unit 10 that accommodates both the optical shutter 1 of this embodiment and a lens 11 between a double-core optical fiber 12 for input light and a single-core optical fiber 13 for output light. In this optical communications device, operation of the optical shutter 1 can switch between transmission of light exiting from a fiber core 12a, which is one core of the double-core optical fiber 12, to a fiber core 13a of the single-core optical fiber 13 and reflection of the light for transmitting the reflected light to a fiber core 12b, which is the other core of the double-core optical fiber 12.

As shown in FIG. 9, light exiting from the double-core optical fiber 12 is collected by the aspheric lens 11 and then enters the optical shutter 1. The optical shutter 1 enables the substrates 8 disposed at an input light side and an output light side to function as apertures having pinholes. In accordance with the characteristics of the entire filter defined by the fixed filter 2, the movable filter 3, and the gap 4, which are arranged between the substrates 8, the light is transmitted or reflected. The transmission/blocking of light is controlled by varying the distance of the gap 4 by operating the minute driving elements 5 and thereby varying the characteristics of the entire filter, as in the case of the optical shutter 1 of the first embodiment. The optical shutter 1 of the second embodiment is applied to such optical communications devices so that switching light with higher response speed is achieved.

A third embodiment will now be described. An optical shutter 1 of this embodiment has the same basic structure as that of the first embodiment, in which the fixed filter 2 and the movable filter 3 are arranged with the gap 4 therebetween and the movable filter 3 is driven by the minute driving elements 5 to vary the distance of the gap 4.

The optical shutter 1 of the first embodiment functions as a switch for switching between transmission/blocking of light in a predetermined wavelength region by controlling the position of the movable filter 3 so as to be aligned with each position defined by the bump 2a and the stopper 7. By contrast, in the optical shutter 1 of the third embodiment, the position of a movable filter 3 is controlled so as to be aligned with the middle of each position defined by a bump 2a and a stopper 7 to vary the transmittance of light. In the optical shutter 1 of the third embodiment, the transmittance of light in a wavelength region around 405 nm emitted from a blue laser is varied.

Figure 10:
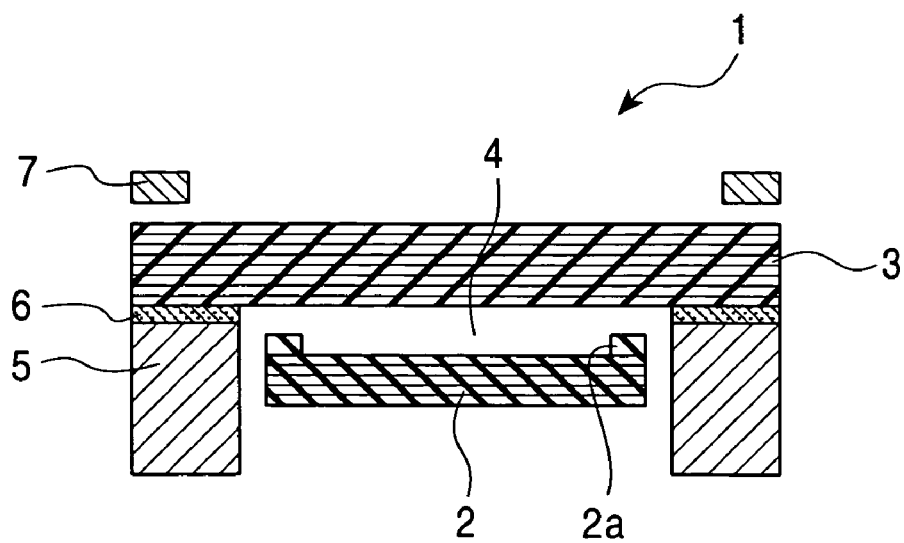
FIG. 10 is a cross-sectional view of an optical shutter in an intermediate state according to a third embodiment.

FIG. 10 is a cross-sectional view of the optical shutter 1 when the movable filter 3 is disposed in an intermediate position. Since the bump 2a on a fixed filter 2 and the stopper 7 restrict the operation of the movable filter 3, the movable filter 3 vertically moves in the drawing in the range limited by the bump 2a and the stopper 7. The movable filter 3 can be arranged in the intermediate position by adjusting the application of an electric field to piezoelectric elements comprising minute driving elements 5.

When the multi-layer filters and the gap 4 function as a band-pass filter, as with the first embodiment, a minute change in the distance of the gap 4 greatly varies the transmittance of light. In the first embodiment for performing simply switch-on and switch-off operations, a band-pass filter is advantageous in that the switching is achieved by a slight operation. By contrast, as in the third embodiment, in order to control the transmittance in the intermediate position, it is desired that the degree of variation of the transmittance in accordance with the change in the distance of the gap 4 be smaller.

Therefore, in the third embodiment, the multi-layer filters and the gap 4 function as a minus filter that reflects light in a predetermined wavelength region. For the transmittance characteristics of the minus filter, the transmittance of light in a particular wavelength region is substantially 0%, a plurality of ripples occurs prior to and subsequent to the wavelength region, and a plurality of wavelength regions having lower transmittance occurs. The ranges where the ripples occur are referred to as harmonic ranges. In this embodiment, in the harmonic ranges in the transmittance characteristics of this minus filter, the entire filter is designed so that light in a predetermined wavelength region is transmitted or not transmitted. This achieves a smaller variation in transmittance in accordance with the change in the distance of the gap 4.

Figure 11:
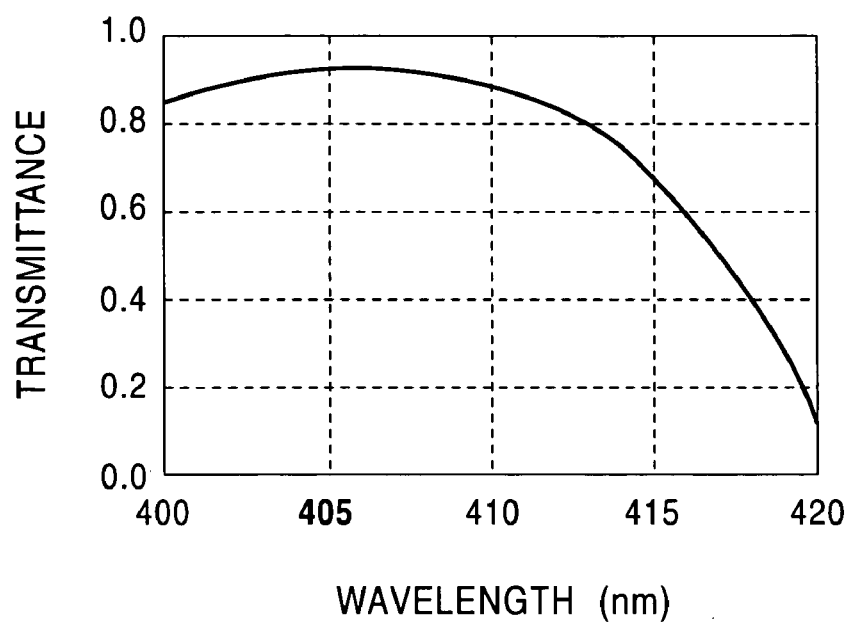
FIG. 11 illustrates the transmittance characteristics of the optical shutter of the third embodiment when the optical shutter has maximum transmittance.

FIG. 11 illustrates the transmittance characteristics of the optical shutter 1 of the third embodiment when the optical shutter 1 has maximum transmittance. In this embodiment, the height of the bump 2a is 1 μm and the minimum distance of the gap 4 is 1 μm. In this case, as shown in FIG. 11, at a wavelength of 405 nm, the transmittance is 90% or more and thus almost all light is transmitted. A set value for reflecting light in the minus filter exists in the wavelength region below 405 nm. When the distance of the gap 4 is increased by operating the movable filter 3, the positions of the ripples are shifted to a shorter-wavelength range.

Figure 12:
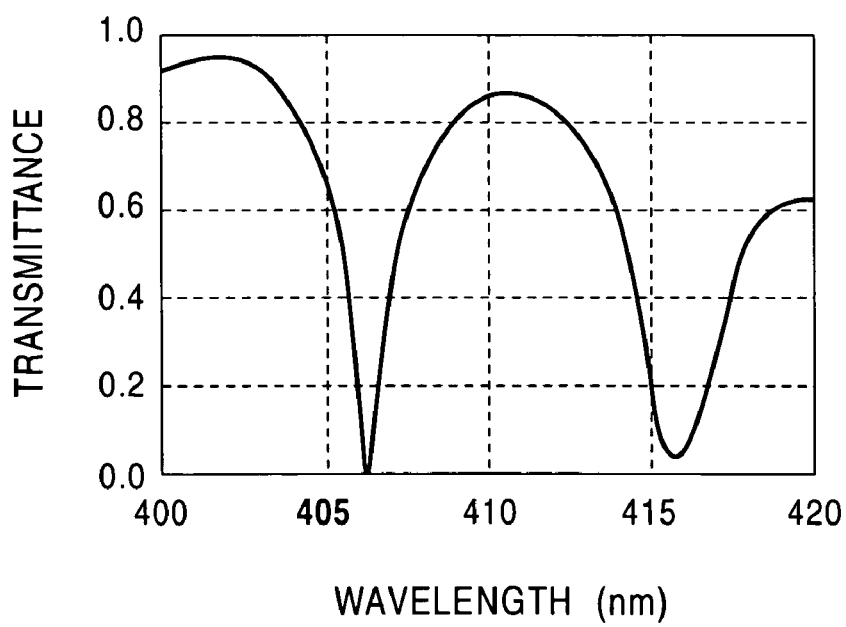
FIG. 12 illustrates the transmittance characteristics of the optical shutter of the third embodiment when the optical shutter has intermediate transmittance.

FIG. 12 illustrates the transmittance characteristics of the optical shutter 1 of the third embodiment when the optical shutter 1 has intermediate transmittance. In this drawing, a case where the movable filter 3 is moved with the application of an electrical field to the minute driving elements 5 and the distance of the gap 4 is 7 μm is shown. In this case, as shown in FIG. 12, the transmittance at a wavelength of 405 nm is about 65% and the transmittance is less than that in FIG. 11. The degree of variation in transmittance characteristics in accordance with the changes in distance of the gap 4 is relatively small, and therefore, the transmittance of light can be set to any value in accordance with the change in distance of the gap 4.

Figure 13:
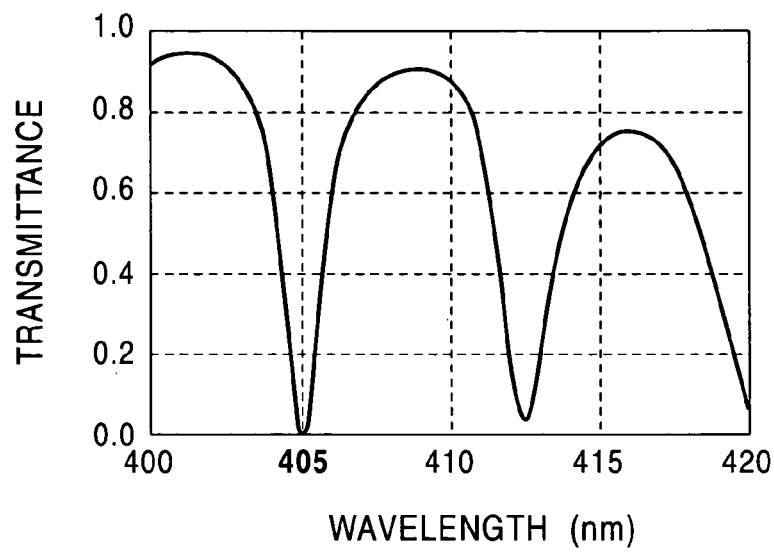
FIG. 13 illustrates the transmittance characteristics of the optical shutter of the third embodiment when the optical shutter has minimum transmittance.

FIG. 13 illustrates the transmittance characteristics of the optical shutter 1 of the third embodiment when the optical shutter 1 has minimum transmittance. In this drawing, a case where the minute driving elements 5 are expanded to the maximum position and come into contact with the stopper 7 and the distance of the gap 4 is 9 μm is shown. In this case, as shown in FIG. 13, at a wavelength of 405 nm, the transmittance is substantially 0% at the minimum among the bottoms of the ripples, and therefore, almost all of the entering light is reflected. The entire filter as in this embodiment is configured so as to adjust the position of the movable filter 3 by the minute driving elements 5, thus achieving an optical shutter capable of varying the transmittance of light in a predetermined wavelength region.

Figure 14:
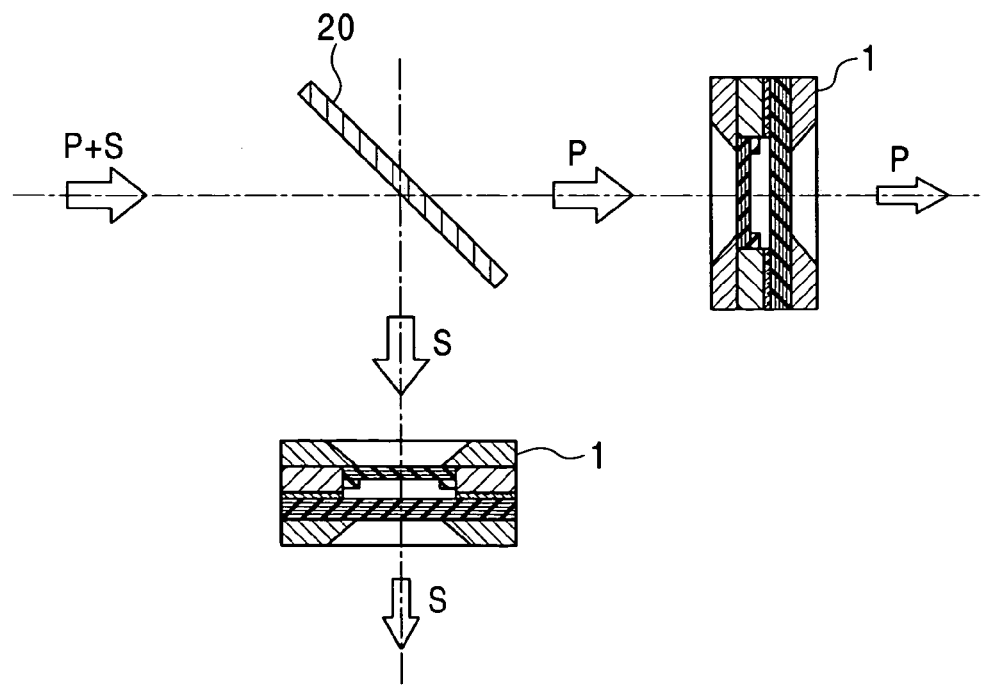
FIG. 14 is a schematic illustration of a variable branch module including two optical shutters according to a fourth embodiment.

FIG. 14 is a schematic illustration of a variable branch module including two optical shutters 1 according to a fourth embodiment. This variable branch module may be used as a device for dividing light into a reference beam and a beam to illuminate an object and also for controlling the intensity ratio between these beams in a holographic memory unit. The variable branch module is not limited to use as this device and may be used as a general optical branching device. As with the third embodiment, in each of the optical shutters 1 of the fourth embodiment, the entire filter functions as a minus filter and the position of a movable filter 3 is adjusted by minute driving elements 5. The optical shutter 1 has substrates 8 functioning as apertures, as with the second embodiment.

As shown in FIG. 14, this variable branch module first divides entering light by a polarizing branch filter 20, such as a PBS prism. Specifically, it divides entering light by transmitting one divided part and reflecting another divided part in accordance with the direction of polarization of the light. More specifically, the polarizing branch filter 20, when inclined at about 45 degrees toward the entering light, divides the entering light including both a p-polarized beam and an s-polarized beam so that the p-polarized beam is transmitted and the s-polarized beam is reflected so as to be orthogonal to the entering light.

The optical shutters 1 of this embodiment are disposed in optical paths of the transmitted p-polarized beam and the reflected s-polarized beam. Controlling the transmittance of light in the optical shutters 1 allows the intensity ratio of each of the polarized beams to be controlled. When only the intensity ratio of the polarized beams is controlled, one of the optical shutters 1 may be disposed in either of the optical paths of the p-polarized beam and the s-polarized beam. When the optical shutters 1 are disposed in both optical paths of the polarized beams, not only the intensity ratio of the polarized beams but also an absolute value of the intensity ratio without changing the intensity ratio may be controlled.

Although the present invention has been described in detail with reference to the above preferred embodiments, it is not limited to these embodiments. It will be understood that various modifications may be made without departing from the spirit of the present invention or from the scope of the appended claims.

What is claimed is:

1. An optical shutter comprising:
 a multi-layer fixed filter and a multi-layer movable filter arranged with a gap therebetween, the optical shutter controlling the transmittance of light passing through the multi-layer filters, and
 minute driving elements provided on the movable filter,
 wherein operating the minute driving elements varies a distance of the gap defined between the fixed filter and the movable filter, and
 wherein operation of the movable filter is restricted by a stopper that comes into contact with the movable filter when the gap has a maximum distance and by a bump, that comes into contact with the movable filter when the gap has a minimum distance, formed on the fixed filter.

2. The optical shutter according to claim 1, wherein the minute driving elements are joined to the movable filter with elastic bonding layers therebetween.

3. The optical shutter according to claim 1, wherein the fixed filter, the gap, and the movable filter function as a band-pass filter.

4. The optical shutter according to claim 1, wherein the fixed filter, the gap, and the movable filter function as a minus filter and a predetermined wavelength region in which transmittance is controlled lies in a harmonic range in the transmittance characteristics of the minus filter.

* * * * *